US012707299B2

(12) United States Patent
Saha et al.

(10) Patent No.: US 12,707,299 B2
(45) Date of Patent: Aug. 11, 2026

(54) EXTERNAL SERVICE INTEGRATION WITH CELLULAR NETWORKS

(71) Applicant: Boost SubscriberCo L.L.C., Englewood, CO (US)

(72) Inventors: Sougata Saha, Aurora, CO (US); Brian Mengwasser, Denver, CO (US); Andrew Trujillo, Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 416 days.

(21) Appl. No.: 18/176,933

(22) Filed: Mar. 1, 2023

(65) Prior Publication Data

US 2023/0284323 A1 Sep. 7, 2023

Related U.S. Application Data

(60) Provisional application No. 63/315,823, filed on Mar. 2, 2022.

(51) Int. Cl.

| | |
|---|---|
| ***H04W 76/20*** | (2018.01) |
| ***H04L 61/2596*** | (2022.01) |
| ***H04W 24/06*** | (2009.01) |
| ***H04W 24/08*** | (2009.01) |
| ***H04W 24/10*** | (2009.01) |
| ***H04W 28/24*** | (2009.01) |
| *H04L 101/654* | (2022.01) |

(52) U.S. Cl.

CPC ......... *H04W 24/06* (2013.01); *H04L 61/2596* (2013.01); *H04W 24/08* (2013.01); *H04W 24/10* (2013.01); *H04W 28/24* (2013.01); *H04W 76/20* (2018.02); *H04L 2101/654* (2022.05)

(58) Field of Classification Search

None

See application file for complete search history.

(56) References Cited

U.S. PATENT DOCUMENTS

| | | | |
|---|---|---|---|
| 9,088,399 B1 | 7/2015 | Poon et al. | |
| 10,764,175 B1 | 9/2020 | Filsfils et al. | |
| 11,695,679 B1 | 7/2023 | Lagerholm et al. | |
| 2013/0301691 A1 | 11/2013 | Wang et al. | |
| 2016/0337919 A1* | 11/2016 | Bindrim ................ | H04L 65/612 |
| 2018/0176845 A1 | 6/2018 | Visuri et al. | |
| 2018/0316779 A1 | 11/2018 | Dowlatkhah et al. | |

(Continued)

FOREIGN PATENT DOCUMENTS

WO 2020/185794 A1 9/2020

OTHER PUBLICATIONS

International Search Report and Written Opinion for PCT/US2023/014324 mailed May 22, 2023, all pages.

(Continued)

*Primary Examiner* — Benjamin Lamont

(74) *Attorney, Agent, or Firm* — Kilpatrick Townsend & Stockton LLP

(57) ABSTRACT

Arrangements detailed herein are directed to modifying functionality of and service provided to user equipment (UE) of a cellular network via integration with an external management system. A core application programming interface (API) can allow the external management system, distinct from the cellular network, to modify one or more parameters maintained by the cellular network core.

18 Claims, 7 Drawing Sheets

(56) References Cited

U.S. PATENT DOCUMENTS

| | | | | |
|---|---|---|---|---|
| 2018/0367940 | A1 | 12/2018 | Kwong et al. | |
| 2020/0081825 | A1 | 3/2020 | Parbhane et al. | |
| 2020/0112497 | A1 | 4/2020 | Yenumulapalli et al. | |
| 2020/0177457 | A1 | 6/2020 | Seenappa et al. | |
| 2021/0352534 | A1* | 11/2021 | Tiwari | H04L 41/5009 |
| 2021/0352606 | A1 | 11/2021 | Hosseinian et al. | |
| 2021/0400572 | A1 | 12/2021 | Caceres et al. | |
| 2022/0007451 | A1* | 1/2022 | Wang | H04L 5/0055 |
| 2022/0060520 | A1 | 2/2022 | Carney Landow et al. | |
| 2022/0061059 | A1 | 2/2022 | Dunsmore et al. | |
| 2022/0086864 | A1* | 3/2022 | Sabella | H04W 28/06 |
| 2022/0104004 | A1* | 3/2022 | Huang | H04W 48/16 |
| 2022/0158926 | A1 | 5/2022 | Wennerstroem et al. | |
| 2022/0264540 | A1* | 8/2022 | Panchal | H04W 72/04 |
| 2022/0337493 | A1 | 10/2022 | Sant et al. | |
| 2022/0338048 | A1 | 10/2022 | Sant et al. | |
| 2022/0408394 | A1* | 12/2022 | Paczkowski | H04M 15/81 |
| 2023/0121268 | A1* | 4/2023 | Mueller | H04L 41/0896 370/229 |
| 2024/0348524 | A1* | 10/2024 | Kodaypak | H04L 47/2416 |
| 2025/0168786 | A1 | 5/2025 | Medeiros De Amorim et al. | |

OTHER PUBLICATIONS

"Conference Reports", USENIX, USENIX, the Advanced Computing Systems Association, Jul. 16, 2021, pp. 1-30, XP061059774, Retrieved from the Internet: URL: http://www.usenix.org/sysem/files/login/articles/105438-OSDI10reports.pdf p. 97, last paragraph-p. 98, paragraph first.

International Search Report and Written Opinion for PCT/US2023/014325 mailed Jun. 5, 2023, all pages.

* cited by examiner

EXTERNAL SERVICE INTEGRATION WITH CELLULAR NETWORKS

CROSS REFERENCES TO RELATED APPLICATIONS

This Application claims priority to provisional U.S. Patent Application No. 63/315,823, filed on Mar. 2, 2022, entitled "Cellular Network Test Environments for Subordinate Networks," the entire disclosure of which is hereby incorporated by reference for all purposes.

BACKGROUND 5G cellular networks have considerable flexibility compared to earlier-generation cellular networks. Through the use of open radio access network (O-RAN) standards in combination with component virtualization, cellular network core components that were previously implemented using specialized hardware can now be implemented as specialized software executed on general-purpose computerized hardware. By using specialized software, considerable flexibility can be present in how the core cellular network operates.

SUMMARY

Various embodiments are described related to an integrated cellular network system. In some embodiments, an integrated cellular network system is described. The system may comprise a cellular network. The cellular network may comprise a cellular network core that communicates with a plurality of radio access network (RAN) components of the cellular network. The cellular network may comprise a core application programming interface (API) that allows an external management system, distinct from the cellular network, to modify a plurality of parameters maintained by the cellular network core. The system may comprise the external management system, separate and distinct from the cellular network. The external management system may comprise a user equipment (UE) database. The external management system may comprise a core interface that communicates with the core API via the Internet. The external management system may comprise an engine configured to determine that a UE from the UE database that has its cellular service provided by the cellular network modified. The engine may cause the core interface to transmit a message to the core API instructing the cellular network core to modify a parameter of the plurality of parameters maintained by the cellular network core.

Embodiments of such a system may include one or more of the following features: the engine may be a quality of service (QoS) engine that may modify a level of QoS provided to the UE by the cellular network using the parameter. The parameter may be a QoS parameter that alters the level of QoS provided by the cellular network to the UE. The cellular network core may be configured to, in response to the QoS parameter, change which slice the UE is assigned. The engine may be a latency adjustment engine that modifies an amount of latency provided to the UE by the cellular network using the parameter. The parameter may be a latency parameter that alters the amount of latency provided by the cellular network to the UE. The system may further comprise a second RAN, separate and distinct from the RAN of the cellular network. The second RAN may communicate with the cellular network core of the cellular network. The second RAN may be operated by an entity that operates the external management system. The message may comprise an instruction to provide the UE with cellular service via the second RAN. The engine may be an international mobile subscriber identity (IMSI) engine that modifies an IMSI assigned to the UE by the cellular network using the parameter. The parameter may be an IMSI parameter that causes the cellular network to change the IMSI assigned to the UE from a first IMSI to a second IMSI. Following completion of a phone call, the IMSI engine modifies the IMSI assigned to the UE by the cellular network using the parameter to change the IMSI assigned to the UE from the second IMSI to the first IMSI. The cellular network may be a 5G New Radio (NR) cellular network. The cellular network core may be implemented on a public cloud-computing platform. The UE may communicate with the external management system via the cellular network and via a second wireless network.

In some embodiments, a method for an external entity to control cellular services is provided. The method may comprise providing, by a cellular network, cellular service to a plurality of user equipment (UE). A cellular network core of the cellular network may communicate with a plurality of radio access network (RAN) components of the cellular network. The cellular network core may use a core application programming interface (API) to communicate with an external management system, distinct from the cellular network. The method may comprise receiving, by the cellular network core, via the core API, a request to modify a parameter for a UE of the plurality of UE. The method may comprise modifying, by the cellular network core, the parameter in response to the request received via the core API. The method may comprise providing, by the cellular network, cellular service to the UE in accordance with the modified parameter.

Embodiments of such a method may include one or more of the following features: the parameter may be a quality of service (QoS) parameter that alters a level of QoS provided by the cellular network to the UE. The method may further comprise, based on the modified parameter, altering a slice to which the UE is assigned. The parameter may be a latency parameter that alters an amount of latency provided by the cellular network to the UE. The parameter may be an IMSI parameter that causes the cellular network to change the IMSI assigned to the UE from a first IMSI to a second IMSI. The parameter may cause the cellular network to provide the UE with cellular service via a second RAN. The second RAN may be separate and distinct from the RAN of the cellular network. The second RAN may communicate with the cellular network core of the cellular network. The method may further comprise determining, by the external management system, that a service provided to the UE is to be modified. The method may further comprise determining, by the external management system, the parameter to be updated at the cellular network. The method may further comprise transmitting, by the external management system, to the cellular network core via the core API, the parameter along with an indication of the UE. The method may further comprise receiving, by the external management system, feedback from the UE via a wireless network distinct from the cellular network. The external management system may determine that the service provided to the UE may be modified based on the feedback. The cellular network may be a 5G New Radio (NR) cellular network. The cellular network core may be executed on a public cloud computing platform.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguish among the similar components. If only the first reference label is used in the specification, the description is applicable to any one of the similar components having the same first reference label irrespective of the second reference label.

DETAILED DESCRIPTION

Figure 1A:
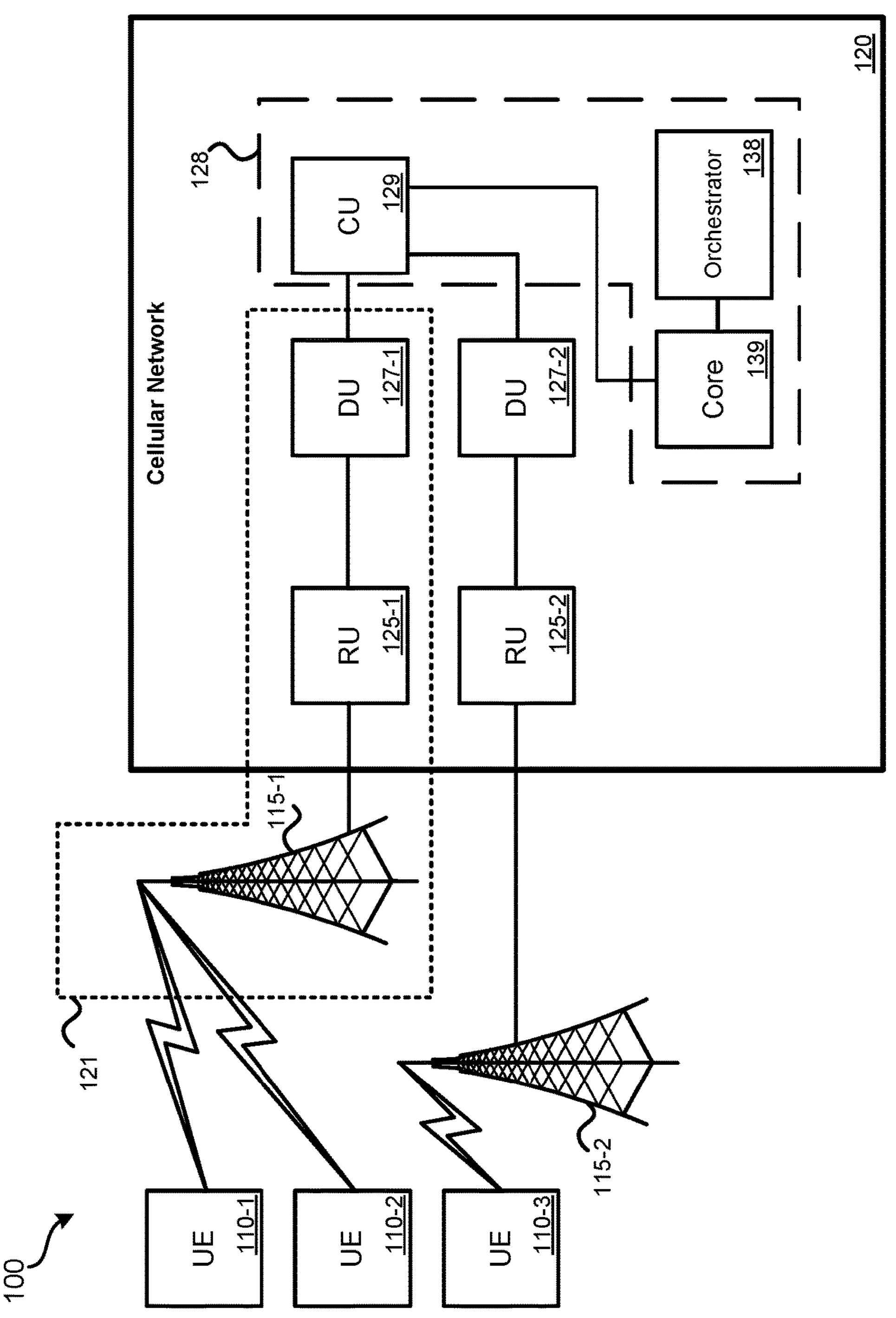
FIG. 1A illustrates an embodiment of a 5G cellular network.

A cellular network can be used to provide a large number of user equipment (UE) with cellular service. By using component virtualization, rather than using specialized hardware, specialized software executed on general-purpose computing platforms can be used to perform many functions of a cellular network. A cellular network can include a radio access network (RAN) and core. The core may be entirely executed on general-purpose computing components. Such an arrangement provides substantial flexibility, such as allowing the core to be executed on a cloud-computing platform.

Components within the core may communicate with each other using application programming interfaces (APIs). Communication access to components within the core of the cellular network may conventionally be limited to other components of the cellular network, such as RAN components and other core components. However, as detailed here, via an exposed API, access can be granted to modify particular parameters that affect performance and functionality of UE within the core. In embodiments detailed herein, an external management system that is operated by an entity separate and distinct from the cellular network can be granted access to modify one or more parameters maintained by and within the cellular network core. The external management system can be authorized to modify these one or more parameters for UE that have been associated with the external management system. This arrangement can allow the external management system to provide services to and control functionality of UE that would otherwise be unavailable.

Such an external management system may use direct access to the cellular network core to modify the quality of service (QoS), latency, or both experienced by a particular UE. To address particular needs of the UE, a QoS level, maximum latency, or both provided to the UE can be adjusted in near real time by the external management system. In some embodiments, an entity may operate a separate RAN, but rely on the cellular network's core rather than maintaining its own core. For example, a factory may have cellular radios, antennas, and other RAN components installed on-site, but use the cellular network's core for hosting cellular communication with a large number of cellular network-enabled internet of things (IoT) devices. In such an arrangement, the external management system can directly interface with the cellular network core to add or remove UE from having access to the separate RAN and the QoS level, latency, or both provided to such devices.

Additionally or alternatively, the external management system can control the international mobile subscriber identity (IMSI) assigned to a particular UE. In certain circumstances, a user may desire to make a highly secure call by using a different IMSI than typically used by the UE. The external management system can coordinate the IMSI of the UE being temporarily changed such that the call is not linked to the UE's normal IMSI.

Further detail regarding such embodiments and others is provided in relation to the figures. FIG. 1A illustrates an embodiment of a cellular network system 100 ("system 100"). System 100 can include a 5G New Radio (NR) cellular network; other types of cellular networks, such as 4G LTE, 6G, 7G, etc. are also possible. System 100 can include: UE 110 (UE 110-1, UE 110-2, UE 110-3); base station 115; cellular network 120; radio units 125 ("RUs 125"); distributed units 127 ("DUs 127"); centralized unit 129 ("CU 129"); core 139, and orchestrator 138. FIG. 1A represents a component level view. In a virtualized open radio access network (O-RAN), because components can be implemented as software in the cloud, except for components that need to receive and transmit RF, the functionality of various components can be shifted among different servers, for which the hardware may be maintained by a separate (public) cloud-service provider, to accommodate where the functionality of such components is needed, as detailed in relation to FIG. 2.

UE 110 can represent various types of end-user devices, such as smartphones, cellular modems, cellular-enabled computerized devices, sensor devices, manufacturing equipment, gaming devices, access points (APs), any computerized device capable of communicating via a cellular network, etc. UE can also represent any type of device that has incorporated a 5G interface, such as a 5G modem. Examples include sensor devices, Internet of Things (IoT) devices, manufacturing robots; unmanned aerial (or land-based) vehicles, network-connected vehicles, environmental sensors, etc. UE 110 may use RF to communicate with various base stations of cellular network 120. As illustrated, two base stations 115 (BS 115-1, 115-2) are illustrated. Real-world implementations of system 100 can include many (e.g., hundreds, thousands) of base stations, and many RUs, DUs, and CUs. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT, such as 4G Long Term Evolution (LTE). The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1) located on site at the base station. In some embodiments, the DU may be physically remote from the RU. For instance, multiple DUs may be housed at a central location and connected to geographically distant (e.g., within a couple kilometers) RUs.

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, RUs, DUs, and CUs create a gNodeB, which serves as the radio access network (RAN) of cellular network 120. CU 129 can communicate with core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or core 139. Other DUs may or may not have this capability.

Figure 1B:
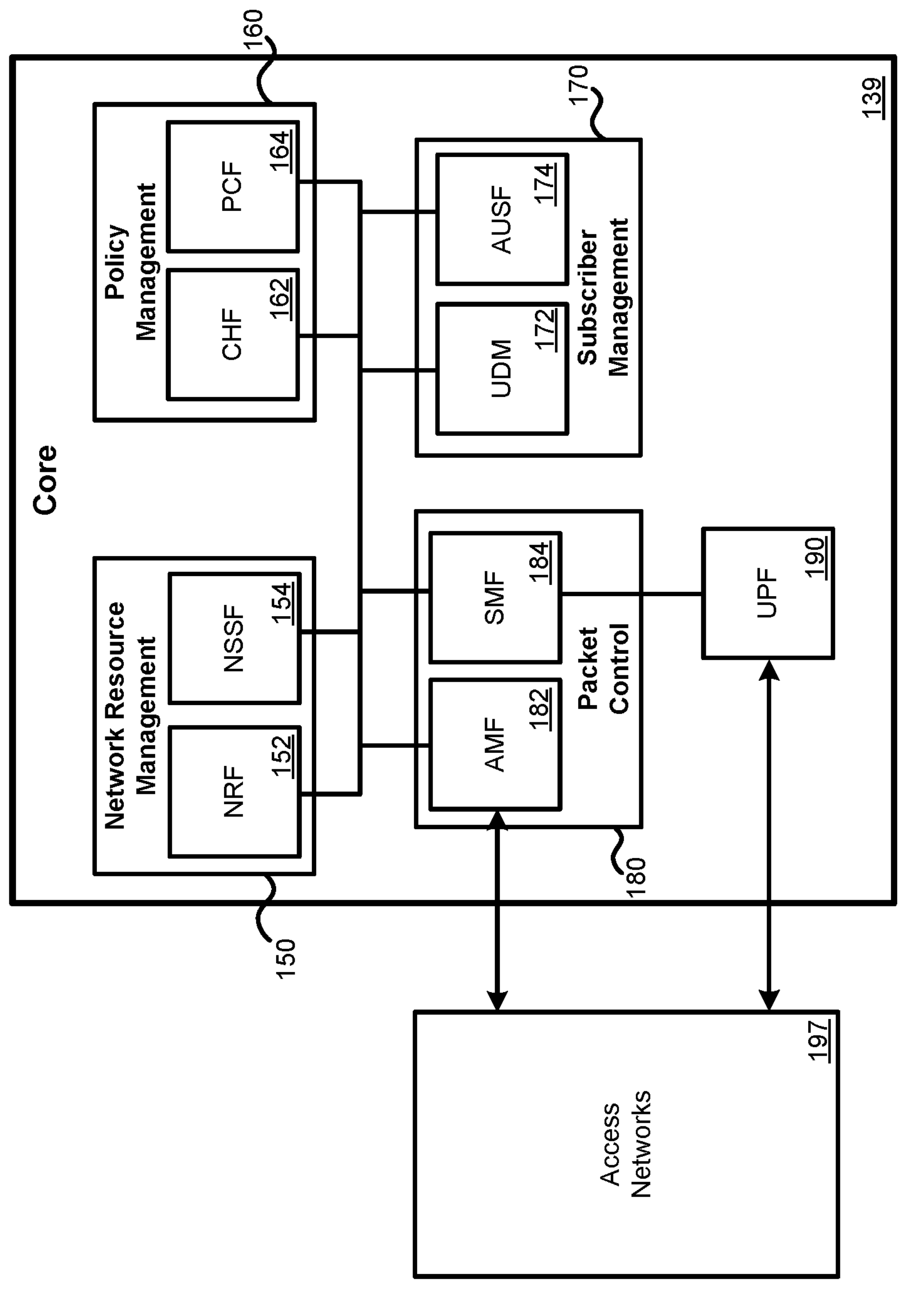
FIG. 1B illustrates an embodiment of a 5G core of a 5G cellular network.

Further detail regarding exemplary core 139 is provided in relation to FIG. 1B. Core 139, which can be physically distributed across data centers or located at a central national data center (NDC) as detailed in relation to FIG. 2, can perform various core functions of the cellular network. Core 139 can include: network resource management components 150; policy management components 160; subscriber management components 170; and packet control components 180. Individual components may communicate on a bus, thus allowing various components of core 139 to communicate with each other directly. Core 139 is simplified to show some key components. Implementations can involve additional other components.

While the example of core 139 has relatively few components, a real-world core may have tens or hundreds of components. These components may be authorized to communicate with various other core components, such as using APIs. Via an external API interface, as detailed in relation to FIGS. 3-6, some of these APIs may be made available to a system external of the cellular network, thus allowing for direct interaction between some components of core 139 and external systems.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU sessions for interconnecting with a Data Network (DN) 195 (e.g., the Internet) or various access networks 197. Access networks 197 can include the RAN of cellular network 120 of FIG. 1A. As detailed in relation to FIG. 4, a separate external RAN network may additionally or alternatively be used.

While FIGS. 1A and 1B illustrate various components of cellular network 120, it should be understood that other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In a virtualized arrangement, specialized software on general-purpose hardware may be used to perform the functions of components such as DU 127, CU 129, and core 139. Functionality of such components can be co-located or located at disparate physical server systems. For example, certain components of core 139 may be co-located with components of CU 129.

In a possible O-RAN implementation, DUs 127, CU 129, core 139, and/or orchestrator 138 can be implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, core 139, and orchestrator 138. In some embodiments, DUs 127 may be partially or fully added to cloud-based cellular network components 128. Such cloud-based cellular network components 128 may be executed as specialized software executed by underlying general-purpose computer servers. Cloud-based cellular network components 128 may be executed on a public third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested. A "public" cloud-based computing platform refers to a platform where various unrelated entities can each establish an account and separately utilize the cloud computing resources, the cloud computing platform managing segregation and privacy of each entity's data.

Kubernetes, or some other container orchestration platform, can be used to create and destroy the logical DU, CU, or 5G core units and subunits as needed for the cellular network 120 to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU no longer exists, Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Figure 2:
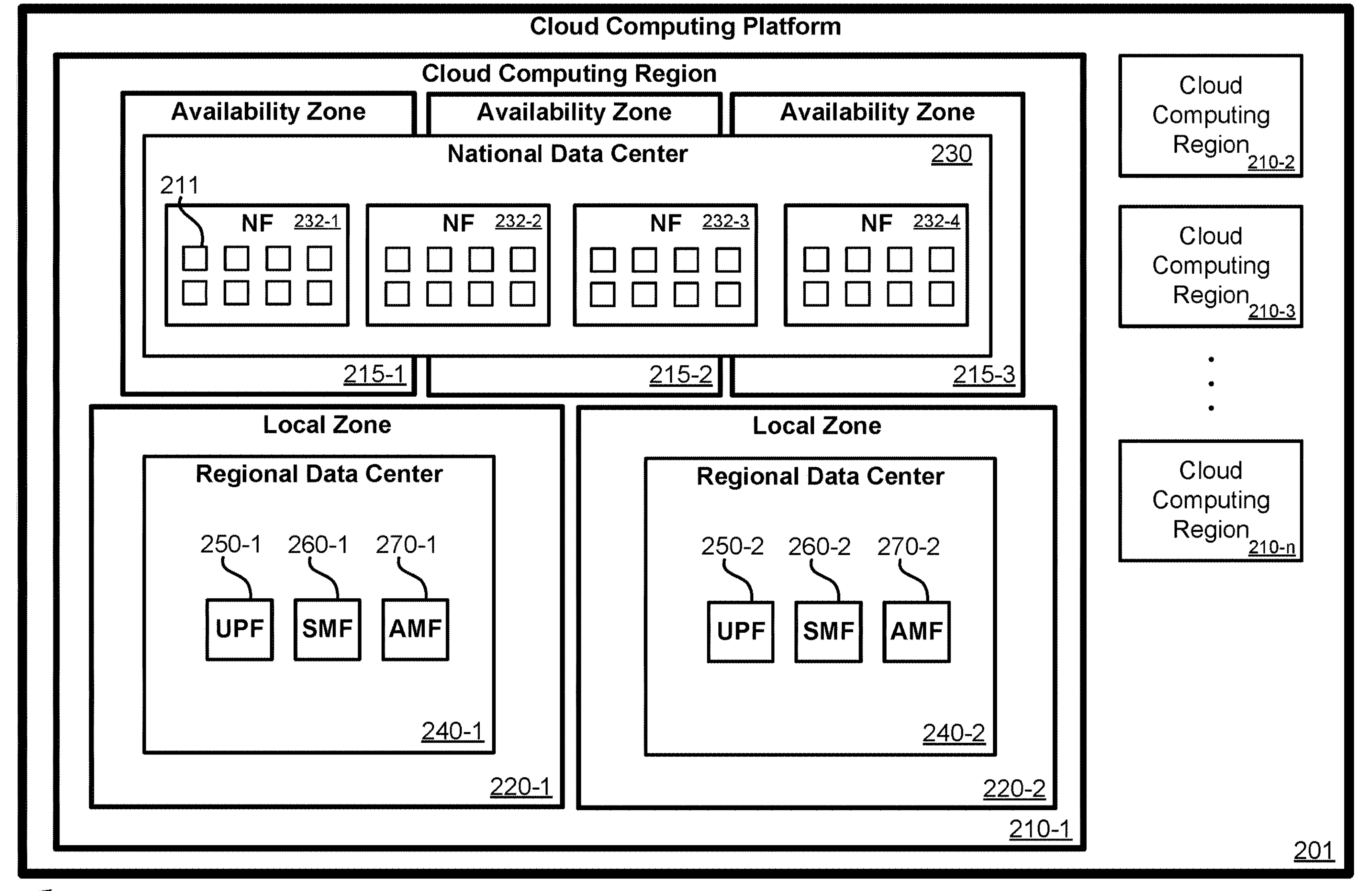
FIG. 2 illustrates an embodiment of a 5G core implemented using a cloud computing platform.

Orchestrator 138 can allow for the instantiation of new cloud-based components of cellular network 120, including components detailed in relation to FIGS. 1A, 1B, and 2. As an example, to instantiate a new DU, orchestrator 138 can perform a pipeline of calling the DU code from a software repository incorporated as part of, or separate from, cellular network 120; pulling corresponding configuration files (e.g., helm charts); creating Kubernetes nodes/pods; loading DU containers; configuring the DU; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 125-1 and DU 127-1; a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

FIG. 2 illustrates an embodiment of a cellular network core network topology 200 as implemented on a public cloud-computing platform. Cellular network core network topology 200 can represent how logical cellular network groups are distributed across cloud computing infrastructure of cloud computing platform 201. Cloud computing platform 201 can be logically and physically divided up into various different cloud computing regions 210. Each of cloud computing regions 210 can be isolated from other cloud computing regions to help provide fault tolerance, fail-over, load-balancing, and/or stability and each of cloud computing regions 210 can be composed of multiple availability zones, each of which can be a separate data center located in general proximity to each other (e.g., within 100 miles). Further, each of cloud computing regions 210 may provide superior service to a particular geographic region based on physical proximity. For example, cloud computing region 210-1 may have its datacenters and hardware located in the northeast of the United States while cloud computing region 210-2 may have its datacenters and hardware located in California. For simplicity, the details of the cellular network as executed in only cloud computing region 210-1 are illustrated. Similar components may be executed in other cloud computing regions of cloud computing regions 210 (210-2, 210-3, **210-*n***).

In other embodiments, cloud computing platform 201 may be a private cloud computing platform. A private cloud computing platform may be maintained by a single entity, such as the entity that operates the hybrid cellular network. Such a private cloud computing platform may be only used for the hybrid cellular network and/or for other uses by the entity that operates the hybrid cellular network (e.g., streaming content delivery).

Each of cloud computing regions 210 may include multiple availability zones 215. Each of availability zones 215 may be a discrete data center or group of data centers that allow for redundancy that allows for fail-over protection from other availability zones within the same cloud computing region. For example, if a particular data center of an availability zone experiences an outage, another data center of the availability zone or separate availability zone within the same cloud computing region can continue functioning and providing service. A logical cellular network component, such as a national data center, can be created in one or across multiple availability zones 215. For example, a database that is maintained as part of NDC 230 may be replicated across availability zones 215; therefore, if an availability zone of the cloud computing region is unavailable, a copy of the database remains up-to-date and available, thus allowing for continuous or near continuous functionality.

On a (public) cloud computing platform, cloud computing region 210-1 may include the ability to use a different type of data center or group of data centers, which can be referred to as local zones 220. For instance, a client, such as a provider of the hybrid cloud cellular network can select from more options of the computing resources that can be reserved at an availability zone compared to a local zone. However, a local zone may provide computing resources nearby geographic locations where an availability zone is not available. Therefore, to provide low latency, certain network components, such as regional data centers, can be implemented at local zones 220 rather than availability zones 215. In some circumstances, a geographic region can have both a local zone and an availability zone.

In the topology of a 5G NR cellular network, 5G core functions of core 139 can logically reside as part of a national data center (NDC). NDC 230 can be understood as having its functionality existing in cloud computing region 210-1 across multiple availability zones 215. At NDC 230, various network functions, such as NFs 232, are executed. For illustrative purposes, each NF, whether at NDC 230 or elsewhere located, can be comprised of multiple subcomponents, referred to as pods (e.g., pod 211) that are each executed as a separate process by the cloud computing environment. The illustrated numbers of pods are merely an example; fewer or greater numbers of pods may be part of the respective 5G core functions. It should be understood that, in a real-world implementation, a cellular network core, whether for 5G or some other standard, can include many more network functions. By distributing NFs 232 across availability zones, load-balancing, redundancy, and fail-over can be achieved. In local zones 220, multiple regional data centers 240 can be logically present. Each of regional data centers 240 may execute 5G core functions for a different geographic region or group of RAN components. As an example, 5G core components that can be executed within an RDC, such as RDC 240-1, may be: UPFs 250, SMFs 260, and AMFs 270. While instances of UPFs 250 and SMFs 260 may be executed in local zones 220, SMFs 260 may be executed across multiple local zones 220 for redundancy, processing load-balancing, and fail-over.

Figure 3:
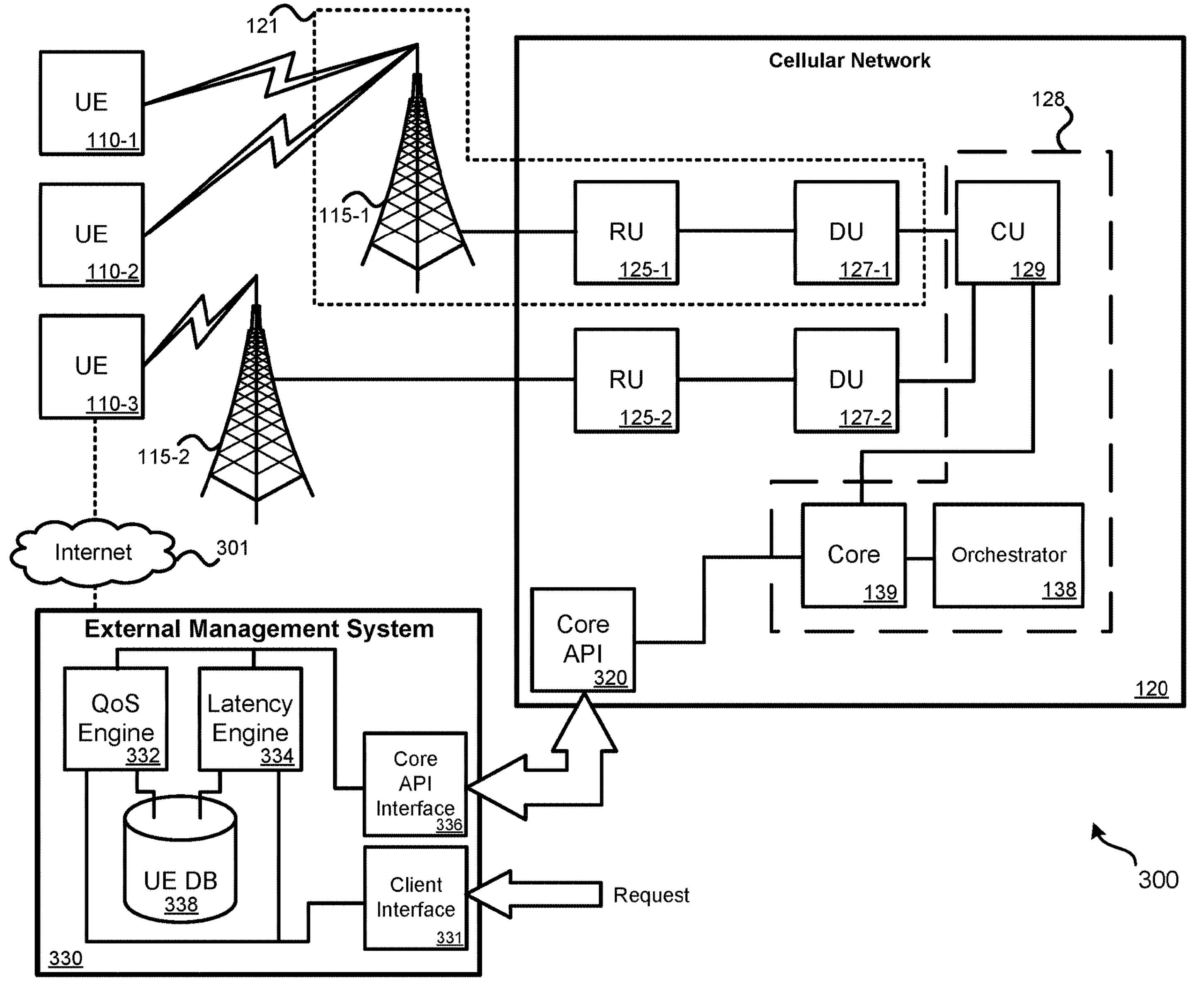
FIG. 3 illustrates an embodiment of a system in which an external management system operated by an external entity can communicate with a cellular network core.

While a cellular network provider may provide all of the services that many customers and entities desire, there may be groups of persons or entities that desire specialized services not offered by the cellular network provider or services that provide a higher level of customization than what is directly offered by the cellular network provider. FIG. 3 illustrates an embodiment of an integrated cellular network system 300 ("system 300") in which an external entity operating that is external management system 330 ("EMS 330") communicates with a cellular network to provide add-on services related to adjustment of QoS and/or latency parameters.

In system 300, cellular network 120 has core API 320 exposed to authorized external systems, such as EMS 330, that allows for external access to modify various parameters maintained at core 139. EMS 330 can be permitted to alter particular parameters corresponding to UE that have been associated with EMS 330. For example, EMS 330 may be operated by an entity that operates a manufacturing facility. EMS 330 may be granted access to modify particular parameters maintained for the UE at core 139 via core API 320 that control the QoS and latency provided to the individual UE (e.g., sensor devices, manufacturing robots) operated by the entity at the manufacturing facility.

EMS 330 can include various components, such as: QoS engine 332, latency engine 334, UE database 338 ("UE DB 338") and core interface 336. Core interface 336 can communicate via requests and responses with core API 320 via a network, such as Internet 301. A request can be transmitted by EMS 330 via core interface 336 that requests that a particular parameter maintained by core 139 be modified. In the illustrated embodiment of FIG. 3, EMS 330 can transmit requests for an adjustment related to QoS, latency, or both.

EMS 330 may be implemented using one or more computer systems. EMS 330 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). The functions illustrated for EMS 330 can be implemented as software components executed on underlying hardware. Further, the functions of the components of EMS 330 can be implemented using a cloud-computing platform, which is operated by a separate cloud-service provider that executes code and provides storage for clients.

If an operator of a UE desires aspects of the UE and cellular network functionality to be controlled via EMS 330, the operator of the UE, if different from the operator of EMS 330, may grant permission for EMS 330 to control particular aspects of how the UE and cellular network 120 function together. In response to access being granted, EMS 330 may then access information and control at least some aspects of how the UE functions on cellular network 120. Alternatively, EMS 330 can be operated directly by an entity that desires more control over its UE operating on cellular network 120.

A client, which may operate EMS 330 or may have permission to use EMS 330, can submit a request via client interface 331. The request may be provided by a UE that determines for a service it is to perform that either a higher QoS is needed or a lower QoS is sufficient. QoS engine 332 may receive the request via client interface 331 and evaluate the request to determine whether the QoS provided by cellular network 120 to a particular UE or group of UE should be adjusted to either increase or decrease the QoS. For instance, in some embodiments, QoS engine 332 may receive an indication of an application or function that is about to be performed by the UE. QoS engine 332 may evaluate the currently provided QoS of cellular network 120 to determine if and how the QoS provided should be adjusted. Alternatively, QoS engine 332 may simply receive the instruction from client interface 331 and enact the request, if permitted. QoS engine 332 may be able to send a request via core interface 336 and core API 320 to retrieve a parameter that indicates a QoS level currently being provided by cellular network 120 to a particular (or group of) UE.

In some embodiments, a particular parameter maintained by core 139 can define a QoS provided to a UE. The parameter may be indicative of a QoS level provided to the UE. For instance, the parameter may have a value between 1 and 5 to denote a minimum desired QoS level. For each QoS level, one or more of the following may be defined: maximum packet loss, bit rate (uplink and/or downlink), throughput (uplink and/or downlink), transmission delay, network availability, latency, and jitter. Therefore, by transitioning a UE from a QoS level of 1 to a QoS level of 2, some number of these parameters may be improved.

As an example, a normal QoS level for a customer of cellular network 120 may be 2 (with 5 being the highest, 1 being the lowest). A QoS level of 1 may be desired when the data being obtained from or sent to a UE is not time sensitive. For example, a UE may typically function as a sensor that needs to occasionally report data. A low QoS (e.g., QoS level of 1) may be entirely sufficient for data reporting that is not time sensitive. However, occasionally, a higher QoS may be needed to stream 4K video from the device. Therefore, a relatively higher QoS (e.g., QoS level of 3) may be used for such video streaming.

QoS engine 332, based on the request received via client interface, the currently provided QoS level for the UE, and possibly data retrieved from UE DB 338, can transmit a request via core interface 336 to core API 320 requesting that a QoS parameter for the UE be modified. This request can be transmitted directly to core 139 of cellular network 120 via core API 320. In response to receiving the updated QoS level, core 139 can adjust how the UE (or group of UEs) are provided service.

In response to a request to adjust QoS, cellular network 120 may reassign the UE (or group of UE) to a different slice of cellular network 120. This different slice may be configured to satisfy the minimum parameters of the requested QoS level and may also be operating in the geographic region where the UE is located.

In some embodiments, a UE itself may request an adjustment in QoS level via EMS 330. For example, a UE, such as UE 110-3, may determine that it is not receiving sufficient QoS from cellular network 120 in order to perform a particular task. UE 110-3 can transmit a message to client interface 331 indicating that a QoS change is needed. This request can be transmitted via cellular network 120 or via some other network connection via Internet 301, such as a WiFi connection to an Internet Service Provider (ISP).

In some embodiments, latency may be managed separately from QoS levels. Latency engine 334 may function similarly to QoS engine 332: a request may be provided by a UE that determines for a service it is to perform that either a lower latency is needed or that a higher latency would be sufficient. Latency engine 334 may receive the request via client interface 331 and evaluate the request to determine whether the latency provided by cellular network 120 to a particular UE or group of UE should be adjusted to either increase or decrease a maximum permitted latency. For instance, in some embodiments, latency engine 334 may receive an indication of an application or function that is about to be performed by the UE. Latency engine 334 may evaluate the latency currently provided by cellular network 120 to determine if and how the latency should be adjusted. Alternatively, latency engine 334 may simply receive the instruction from client interface 331 and enact the request, if permitted. Latency engine 334 may be able to send a request via core interface 336 and core API 320 to retrieve a parameter that indicates a latency or latency level currently being provided by cellular network 120 to a particular (or group of) UE.

When a request for a change to latency or latency level is received by core 139, the slice the UE is assigned to may be changed. Alternatively, different instantiations of core components which were identified as having higher or lower average latency may be used for the UE.

While a request to QoS engine 332, latency engine 334, or both may be received from a UE via client interface 331, client interface 331 may also receive a request from some other source. For instance, a computer system of the entity that operates the UE may desire to adjust the QoE, latency, or both for various reasons. For instance, a particular UE may be known to be important (or unimportant) for an upcoming action or project, so the QoE, latency, or both may be preemptively adjusted. As another example, the QoE, latency, or both may be adjusted based on a particular UE having been reassigned in function (e.g., from video capture to periodic image still capture).

UE DB 338 may store data about each UE for which EMS 330 can alter the QoS, latency, or both. UE DB 338 may be used to store information about the current QoS level and/or latency for each UE at cellular network 120. UE DB 338 may also be used to store information about the function each UE is currently being used for and conditions particular to the UE that are to be used to trigger a QoS and/or latency adjustment. For example, UE DB 338 may store an indication that, for a particular UE, the UE is not permitted to be given a QoS level above some predetermined maximum level.

Figure 4:
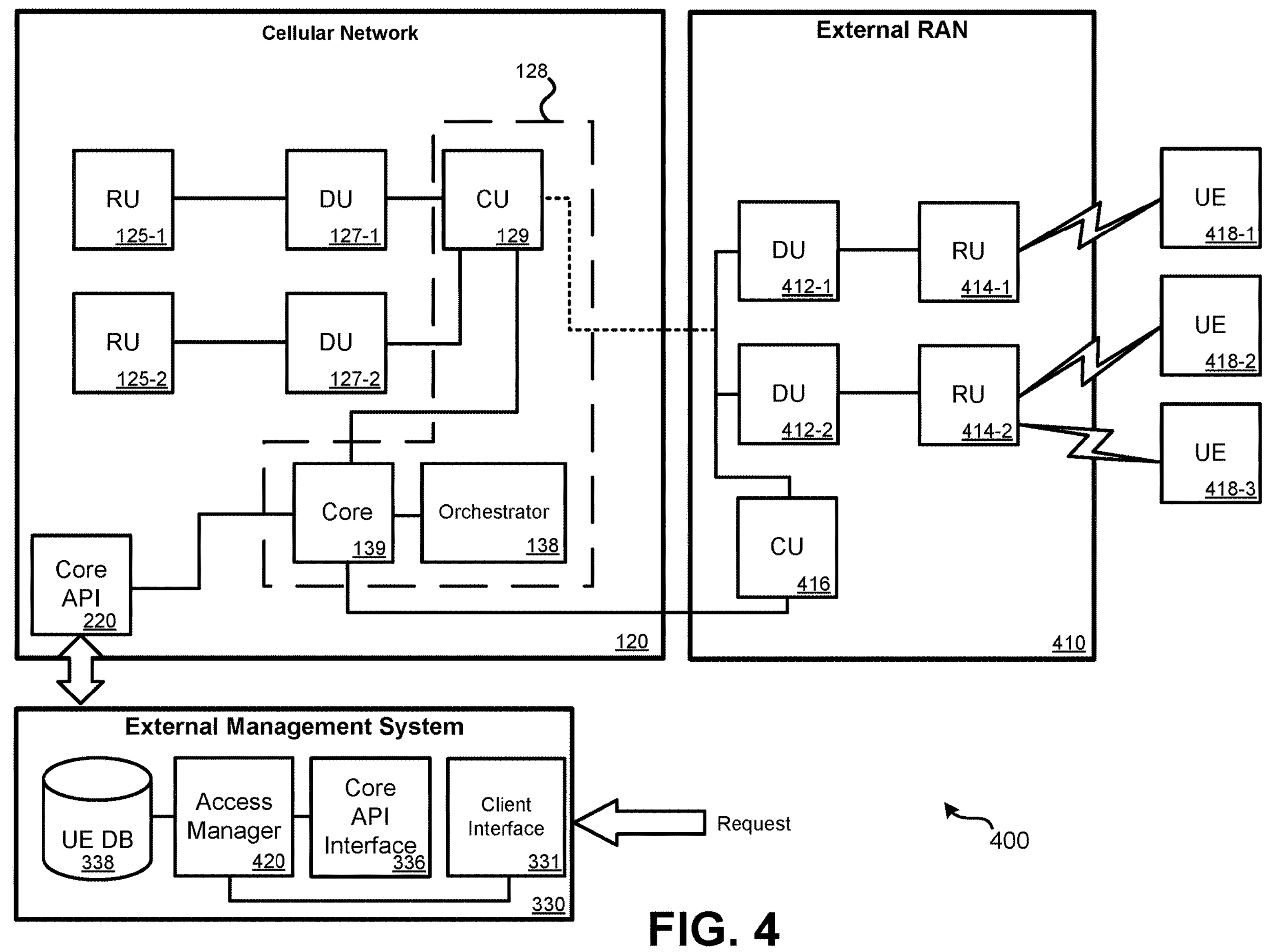
FIG. 4 illustrates another embodiment of a system in which an external management system operated by an external entity can communicate with a cellular network core.

FIG. 4 illustrates another embodiment of an integrated cellular network system 400 ("system 400") in which an external management system operated by an external entity can communicate with a cellular network core. In this embodiment, access manager 420 is present as a component in EMS 330. (In some embodiments, access manager 420 is present in addition to QoS engine 332, latency engine 334, or both.)

External RAN 410 can be operated by an entity distinct from the cellular network provider. For example, the operator of a group of UE may operate external RAN 410. External RAN 410 can include: RUs 414; DUs 412; and CU 416. The specific number of DUs, RU, and CUs, included in external RAN 410 can vary by the size of external RAN 410. In some embodiments, a single RU and DU may be present in external RAN 410, such as to service a single relatively small site (e.g., within one warehouse). Alternatively, external RAN 410 may have many RUs 414 and DUs 412 to service many different geographic locations (e.g., warehouses scattered across the country).

In some embodiments, CU 416 is present. A CU can manage radio resource control (RRC), the service data adaptation protocol (SDAP), and PDCP protocol layers, and can be responsible for non-real-time RRC, and the packet data convergence protocol (PDCP) stack functions. The CU may be implemented as part of external RAN 410 or as part of core 139 and executed on a cloud computing system, and thus separate from external RAN 410. For example, if CU 416 is not present in external RAN 410, DUs 412 may logically communicate with CU 129 and core 139.

Regardless of the specific CU configuration used, core 139 serves to provide external RAN 410 with core functionality. A high-speed connection (e.g., dedicated bandwidth on a private fiber network) between core 139 and CU 416 (or DUs 412 and CU 129) may be used for communication. Core 139 provides all of the core functionality needed by external RAN 410. Specifically which UE and the services, QoE level, and latency provided to UE 418 are managed by EMS 330.

EMS 330, via communication with core 139 via core API 320, can adjust parameter and register/deregister UE for access to external RAN 410. This arrangement allows an entity to maintain a simplified RAN for which only the entity's UE are permitted access, while still allowing the entity significant control via interfacing with core 139 to control parameters and registration of UE. Via parameters that are available for editing in core 139 by access manager 420 of EMS 330, the specific services (e.g., text messaging, calls, Internet access) provided to UE 418 can be controlled.

As detailed in relation to FIG. 3, a request can be received from a UE of UE 418 or from some other system of the client that operates external RAN 410. EMS 330 may be operated by the same entity operating external RAN 410 or by some other external entity. The request can dictate: a UE (or group of UE) to be added or removed from external RAN access; services to be provided or blocked at specific UE (or a group of UE); a QoS level to provide to a specific UE (or group of UE); a maximum latency to provide to a specific UE (or group of UE).

Figure 5:
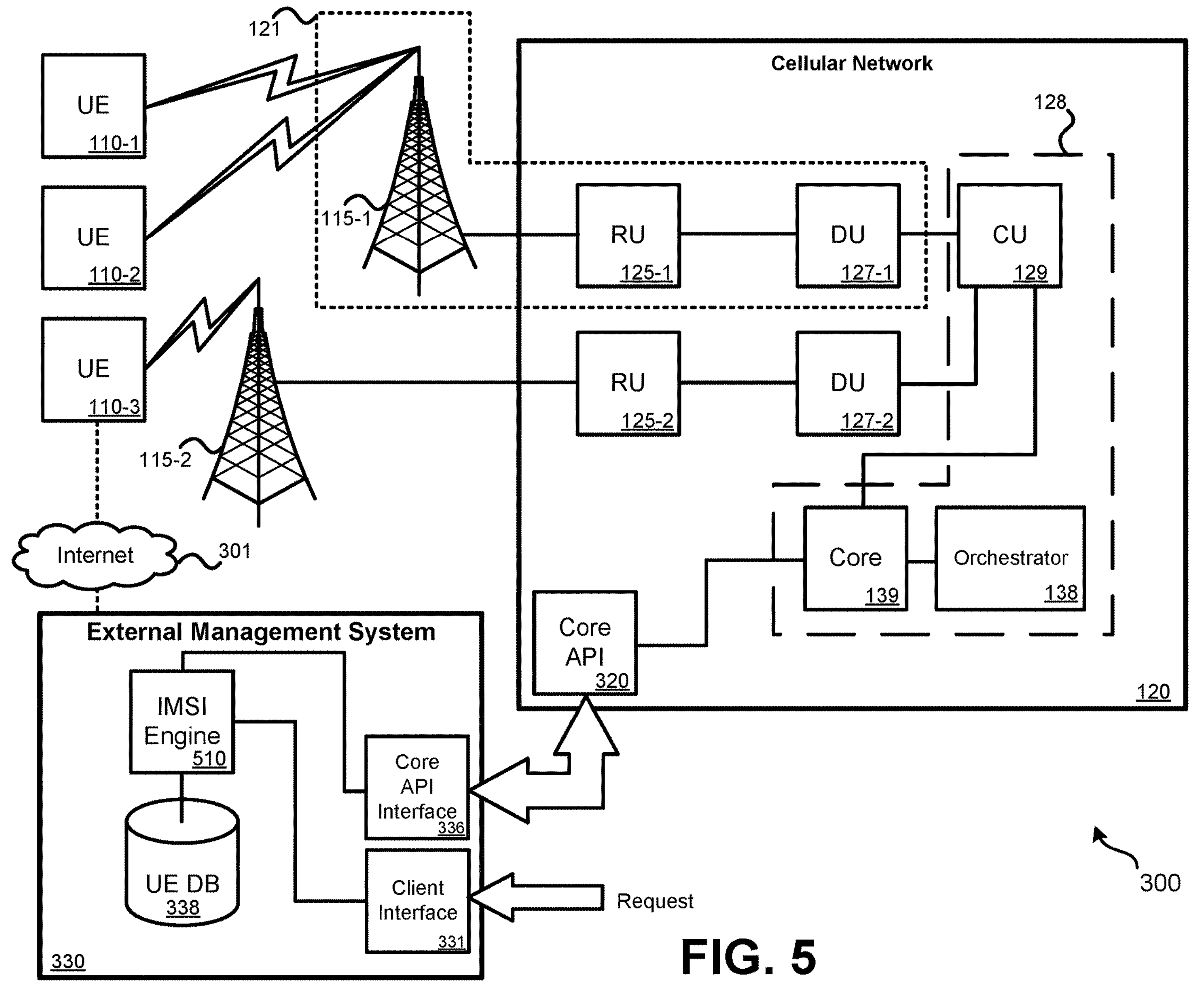
FIG. 5 illustrates another embodiment of a system in which an external management system operated by an external entity can communicate with a cellular network core.

FIG. 5 illustrates another embodiment of an integrated cellular network system 500 ("system 500") in which an external management system operated by an external entity can communicate with a cellular network core. In this embodiment, EMS 330 includes IMSI engine 510, which is used to alter the IMSI assigned to a UE. System 500 can be incorporated with systems 300 and 400, thus allowing IMSI modification to be performed in combination with control of QoS level, maximum latency, use of an external RAN, or some combination thereof.

An IMSI is a unique number assigned to a device on a cellular network. Typically, it is a fifteen digit number that is stored by and sent by the UE to the cellular network. The IMSI can be used to store information by the cellular network about the UE. An IMSI has security implications. Typically, an IMSI is sent over the cellular network as infrequently as possible to reduce the opportunity for the IMSI to be acquired by a nefarious actor. If acquired or stolen, an IMSI can be used to eavesdrop on communications involving the UE to which the IMSI is assigned and/or track the location of the UE.

In order to provide a UE with advanced protection, the IMSI may be altered by EMS 330. In response to a request, such as from the UE or from some other source, IMSI engine 510 of EMS 330 can access core 139 of the cellular network to change the IMSI for a UE. As an example, a user may desire to make a highly secure phone call. Before doing so, the user may send a request from his UE to EMS 330 requesting that the IMSI of his UE be altered for the next 2 hours. IMSI engine 510, after retrieving details of the UE from UE DB 338, may send a request to core 139 via core API 320, causing the IMSI of the UE to be altered. Once the IMSI mapped to the UE has been altered, the phone call can be performed by the UE with a reduced chance of eavesdropping or tracking due to a previously stolen IMSI of the UE.

After the time period has expired or upon a request from the user or UE, the IMSI of the UE may be switched back to the original IMSI of the UE. In addition to preventing the previously stolen IMSI from being used for eavesdropping, such an arrangement can help prevent the location of the UE being tracked while the temporarily assigned IMSI is being used.

As another option, a user may request that the IMSI of his UE be altered periodically, such as once per day. IMSI engine 510, based on data stored in association with the UE in UE DB 338 (e.g., the frequency at which the IMSI should be updated for the UE), can cause the cellular network to change the IMSI at core 139 by sending a request via core API 320.

Figure 6:
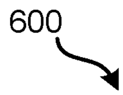
FIG. 6 illustrates an embodiment of a method for an external entity modifying a cellular service provided to a UE via communication with a cellular network core.
Figure 6:
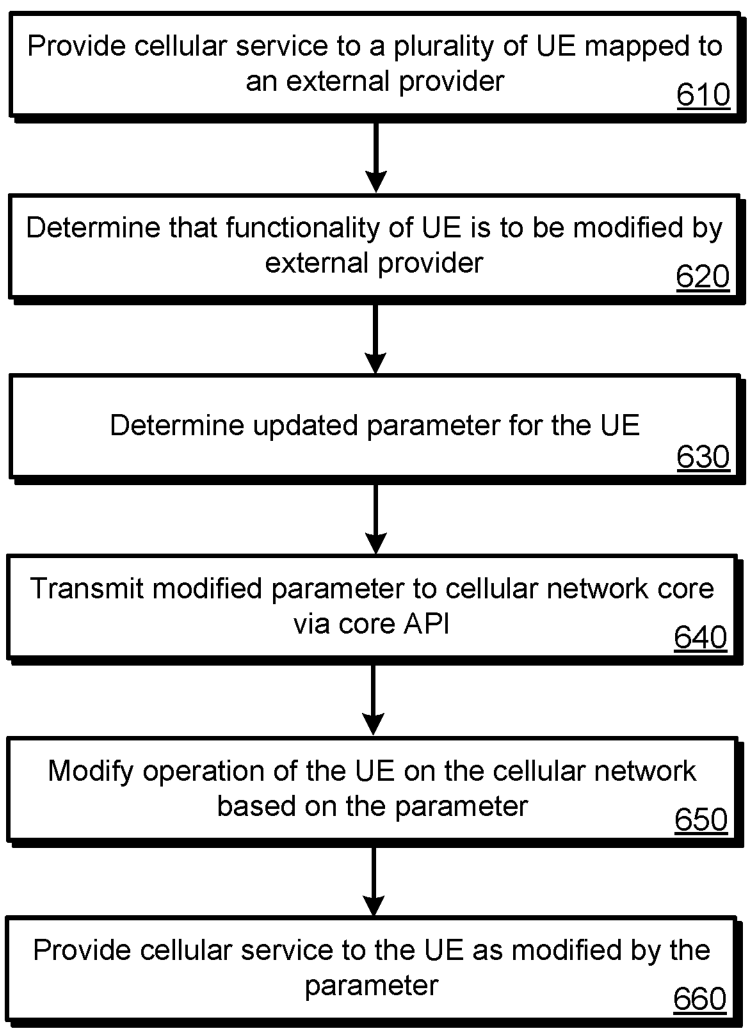

Various methods may be performed using the systems detailed in relation to FIGS. 1A through 5. FIG. 6 illustrates an embodiment of a method 600 for an external entity modifying cellular service provider to a UE via communication with a cellular network core. Method 600 can be performed using system 300, system 400, system 500, or some combination thereof.

At block 610, cellular service is provided by a cellular network to various UE. These UE have been associated with or mapped to an external provider that either operates or has permission to use an external management system, such as EMS 330.

At block 620, a determination is made that the functionality of or service provided to one or more than one UE is to be modified. This determination is made by the EMS, possibly in response to stored data, data received from the cellular network, and/or a request received from the UE or an operator of the UE. At block 630, one or more parameters that are permitted to be modified by the EMS in the cellular network's core are determined and values for such parameters are determined. As previously detailed, these parameters can relate to: QoS level, maximum latency, IMSI assignment, available services, and/or external RAN access. (UE being granted access or removed from access to the external RAN may not have been provided cellular services by the cellular network at block 610.)

At block 640, via the core API, a request with the one or more parameters is transmitted to the cellular network core along with an indication of the UE (or group of UE) for which the parameter is to be modified. Along with the request can be authentication information used by the cellular network to authenticate that the EMS has permission to access the parameters at the core and has permission to adjust parameters for the requested UE.

At block 650, the cellular network core updates the one or more parameters indicated in the request of block 640 and updates how services and functionality are provided to the UE based on the adjusted parameter. At block 660, cellular services are available to the UE in accordance with the one or more modified parameters. Method 600 can then be repeated as often as needed as determined by the EMS.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. An integrated cellular network system, comprising:

a cellular network, comprising:

a cellular network core that communicates with a plurality of radio access network (RAN) components of the cellular network;

a core application programming interface (API) that allows an external management system, distinct from the cellular network, to modify a plurality of parameters maintained by the cellular network core;

the external management system, separate and distinct from the cellular network, comprising:

a user equipment (UE) database;

a core interface that communicates with the core API via the Internet; and an engine configured to determine that a UE from the UE database is to have its cellular service provided by the cellular network modified, wherein:

the engine causes the core interface to transmit a message to the core API instructing the cellular network core to modify a parameter of the plurality of parameters maintained by the cellular network core; and a second RAN, separate and distinct from the plurality of RAN components of the cellular network, wherein:

the second RAN communicates with the cellular network core of the cellular network; and the second RAN is operated by an entity that operates the external management system.

2. The integrated cellular network system of claim 1, wherein:

the engine is a quality of service (QoS) engine that modifies a level of QoS provided to the UE by the cellular network using the parameter; and the parameter is a QoS parameter that alters the level of QoS provided by the cellular network to the UE.

3. The integrated cellular network system of claim 2, wherein the cellular network core is configured to, in response to the QoS parameter, change which slice the UE is assigned.

4. The integrated cellular network system of claim 1, wherein:

the engine is a latency adjustment engine that modifies an amount of latency provided to the UE by the cellular network using the parameter; and the parameter is a latency parameter that alters the amount of latency provided by the cellular network to the UE.

5. The integrated cellular network system of claim 1, wherein the message comprises an instruction to provide the UE with cellular service via the second RAN.

6. The integrated cellular network system of claim 1, wherein:

the engine is an international mobile subscriber identity (IMSI) engine that modifies an IMSI assigned to the UE by the cellular network using the parameter; and the parameter is an IMSI parameter that causes the cellular network to change the IMSI assigned to the UE from a first IMSI to a second IMSI.

7. The integrated cellular network system of claim 6, wherein, following completion of a phone call, the IMSI engine modifies the IMSI assigned to the UE by the cellular network using the parameter to change the IMSI assigned to the UE from the second IMSI to the first IMSI.

8. The integrated cellular network system of claim 7, wherein the cellular network core is implemented on a public cloud-computing platform.

9. The integrated cellular network system of claim 1, wherein the cellular network is a 5G New Radio (NR) cellular network.

10. The integrated cellular network system of claim 1, wherein the UE communicates with the external management system via the cellular network and via a second wireless network.

11. A method for an external entity to control cellular services, the method comprising:

providing, by a cellular network, cellular service to a plurality of user equipment (UE), wherein:

a cellular network core of the cellular network communicates with a plurality of radio access network (RAN) components of the cellular network; and the cellular network core uses a core application programming interface (API) to communicate with an external management system, distinct from the cellular network;

receiving, by the cellular network core, via the core API, a request to modify a parameter for a UE of the plurality of UE, wherein:

the parameter causes the cellular network to provide the UE with cellular service via a second RAN;

the second RAN is separate and distinct from the plurality of RAN components of the cellular network; and the second RAN communicates with the cellular network core of the cellular network;

modifying, by the cellular network core, the parameter in response to the request received via the core API; and providing, by the cellular network, cellular service to the UE in accordance with the modified parameter.

12. The method for the external entity to control the cellular services of claim 11, wherein the parameter is a quality of service (QoS) parameter that alters a level of QoS provided by the cellular network to the UE.

13. The method for the external entity to control the cellular services of claim 12, further comprising:

based on the modified parameter, altering a slice to which the UE is assigned.

14. The method for the external entity to control the cellular services of claim 11, wherein:

the parameter is a latency parameter that alters an amount of latency provided by the cellular network to the UE.

15. The method for the external entity to control the cellular services of claim 11, wherein:

the parameter is an IMSI parameter that causes the cellular network to change the IMSI assigned to the UE from a first IMSI to a second IMSI.

16. The method for the external entity to control the cellular services of claim 11, further comprising:

determining, by the external management system, that a service provided to the UE is to be modified;

determining, by the external management system, the parameter to be updated at the cellular network; and transmitting, by the external management system, to the cellular network core via the core API, the parameter along with an indication of the UE.

17. The method for the external entity to control the cellular services of claim 16, further comprising:

receiving, by the external management system, feedback from the UE via a wireless network distinct from the cellular network, wherein the external management system determines that the service provided to the UE is to be modified based on the feedback.

18. The method for the external entity to control the cellular services of claim 11, wherein:

the cellular network is a 5G New Radio (NR) cellular network; and the cellular network core is executed on a public cloud computing platform.

* * * * *